United States Patent
Zhong et al.

(10) Patent No.: US 11,114,864 B2
(45) Date of Patent: Sep. 7, 2021

(54) METHOD AND DEVICE FOR DISTRIBUTING ACTIVE POWER FOR WIND FARM

(71) Applicant: BEIJING GOLDWIND SCIENCE & CREATION WINDPOWER EQUIPMENT CO., LTD., Beijing (CN)

(72) Inventors: Deshuang Zhong, Beijing (CN); Mengting Yu, Beijing (CN)

(73) Assignee: Beijing Goldwind Science & Creation Windpower Equipment Co., Ltd, Beijing (CN)

( * ) Notice: Subject to any disclaimer, the term of this patent is extended or adjusted under 35 U.S.C. 154(b) by 701 days.

(21) Appl. No.: 15/769,608

(22) PCT Filed: Jun. 7, 2017

(86) PCT No.: PCT/CN2017/087384
§ 371 (c)(1),
(2) Date: Apr. 19, 2018

(87) PCT Pub. No.: WO2018/120652
PCT Pub. Date: Jul. 5, 2018

(65) Prior Publication Data
US 2020/0244072 A1    Jul. 30, 2020

(30) Foreign Application Priority Data
Dec. 26, 2016 (CN) .......................... 201611220564.1

(51) Int. Cl.
*H02J 3/38* (2006.01)
*H02J 3/48* (2006.01)

(52) U.S. Cl.
CPC .............. *H02J 3/48* (2013.01); *H02J 3/381* (2013.01); *H02J 2300/28* (2020.01)

(58) Field of Classification Search
CPC .......... H02J 3/48; H02J 3/381; H02J 2300/28; H02J 3/46; H02J 3/386; Y02E 10/76
See application file for complete search history.

(56) References Cited

U.S. PATENT DOCUMENTS

| 2011/0153099 | A1* | 6/2011 | Garcia | .................. F03D 7/0284 |
| | | | | 700/287 |
| 2011/0166717 | A1* | 7/2011 | Yasugi | .................... F03D 7/048 |
| | | | | 700/287 |

(Continued)

FOREIGN PATENT DOCUMENTS

| CN | 101860042 A | 10/2010 |
| CN | 102013699 A | 4/2011 |

(Continued)

OTHER PUBLICATIONS

Zhang, "Research on Active Power Control Strategy of Wind Farm", Machine Translation, Jun. 25, 2013, Phase 6, electrical manufacturing, ISSN: 1673-5471, p. 19. (Year: 2013).*

(Continued)

*Primary Examiner* — Rocio Del Mar Perez-Velez
*Assistant Examiner* — Olvin Lopez Alvarez
(74) *Attorney, Agent, or Firm* — Finnegan, Henderson, Farabow, Garrett & Dunner LLP

(57) ABSTRACT

A method and device for distributing active power for a wind farm are provided. The method includes: calculating a current total active power variation of the wind farm according to a current frequency variation of a power grid; distributing a current single-unit active power variation to each wind turbine according to a first preset strategy based on the current total active power variation and a single-unit storage energy value in a case that the current total active power variation is greater than zero; distributing the current single-unit active power variation to each wind turbine according to the first preset strategy based on the current total active (Continued)

power variation and a lowerable power value in a case that the current total active power variation is smaller than zero; and controlling each wind turbine to adjust its operating state.

12 Claims, 6 Drawing Sheets

(56) References Cited

U.S. PATENT DOCUMENTS

| | | | | |
|---|---|---|---|---|
| 2011/0309804 | A1* | 12/2011 | Yasugi | F03D 7/0284 322/19 |
| 2012/0203384 | A1* | 8/2012 | Arlaban Gabeiras | F03D 7/0284 700/286 |
| 2013/0015663 | A1* | 1/2013 | Kumula | H02J 3/01 290/52 |
| 2013/0038059 | A1* | 2/2013 | Andresen | H02P 9/48 290/44 |
| 2015/0285220 | A1 | 10/2015 | Hiromasa et al. | |
| 2017/0009738 | A1* | 1/2017 | Brogan | H02J 3/386 |

FOREIGN PATENT DOCUMENTS

| | | |
|---|---|---|
| CN | 102214932 A | 10/2011 |
| CN | 102856925 A | 1/2013 |
| CN | 103219750 A | 7/2013 |
| CN | 103441537 A | 12/2013 |
| CN | 103606966 A | 2/2014 |
| CN | 104917204 A | 9/2015 |
| CN | 105226719 A | 1/2016 |
| CN | 105978041 A | 9/2016 |
| EP | 2928037 A1 | 10/2015 |
| KR | 10-2016-0049107 A | 5/2016 |

OTHER PUBLICATIONS

Fernandez et al, "Comparative study on the performance of control systems for doubly fed induction generator (DFIG) wind turbines operating with power regulation", 2008, pp. 1438-1452 downloaded from the internet https://www.sciencedirect.com/science/article/pii/S0360544208001333 (Year: 2008).*

Cong et al, "Active Power Control Strategy for Wind Farm Based on Wind Turbine Dynamic Classified", 2012, pp. 1-5 downloaded from the internet https://www.researchgate.net/publication/261060916_Active_power_control_strategy_for_wind_farm_based_on_wind_turbine_dynamic_classified (Year: 2012).*

Flores et al, "Application of a control algorithm for wind speed prediction and active power generation", 2005, pp. 523-536 downloaded from the internet https://www.sciencedirect.com/science/article/pii/S0960148104002915 (Year: 2005).*

International Search Report issued in International Application No. PCT/2017/087384, mailed from the State Intellectual Property Office of China dated Sep. 27, 2017, pp. 7.

Zhang, L., "Research on active power control strategy of wind farm", Phase 6, Electrical Manufacturing, ISSN: 1673-5471, pp. 28-31, dated Jun. 25, 2013.

Extended European Search Report issued in corresponding European Patent Application No. 17849893.7, dated Apr. 5, 2019, pp. 10.

Australian 1$^{st}$ Office Action issued in corresponding Australian Patent Application No. 2017332959, dated Feb. 15, 2019, pp. 7.

Hansen, A.D., et al., "Centralised power control of wind farm with doubly fed induction generators", Renewable Energy, vol. 31, No. 7, pp. 935-951, dated Jun. 1, 2006.

* cited by examiner

METHOD AND DEVICE FOR DISTRIBUTING ACTIVE POWER FOR WIND FARM

TECHNICAL FIELD

The present disclosure is a national phase of International Application No. PCT/CN2017/087384, titled "METHOD AND DEVICE FOR DISTRIBUTING ACTIVE POWER FOR WIND FARM", filed on Jun. 7, 2017, which claims the priority to Chinese Patent Application No. 201611220564.1, titled "METHOD AND DEVICE FOR DISTRIBUTING ACTIVE POWER FOR WIND FARM", filed on Dec. 26, 2016 with the State Intellectual Property Office of People's Republic of China, the content of which are incorporated herein by reference in their entirety.

BACKGROUND

When a wind farm is involved in power grid frequency modulation control, it requires the wind farm to increase or decrease certain active power output to the power grid in a short time. Thus, each wind turbine in the wind farm is required to further increase or decrease certain active power output with respect to the original active power output, to meet the demand of the power grid. Different wind turbines in the same wind farm in different operating states have different changeable active power values.

In the conventional technology, reasonable calculation of the active power value to be changed is not performed on each wind turbine during frequency modulation control to meet the demand of the power grid. Thus, the active power value to be changed for some wind turbines is much greater than the active power value to be changed for other wind turbines. That is, the active power value to be changed for each wind turbine in the whole wind farm is non-uniform, thereby leading to a long response time of the frequency modulation control and a great impact on the wind turbines during frequency modulation control.

SUMMARY

The present disclosure provides a method for distributing active power for a wind farm, to solve technical problems of the changed active power of each wind turbine in the wind farm being non-uniform, the response time of frequency modulation control being long and the impact on the wind turbine during frequency modulation control being great, since calculation of the active power value to be changed for each wind turbine is not reasonable during frequency modulation control of the power grid in the conventional technology.

According to embodiments of the present disclosure, a method for distributing active power for a wind farm is provided. The method includes:

calculating a current total active power variation of the wind farm according to a current frequency variation of a power grid;

distributing a current single-unit active power variation to each wind turbine according to a first preset strategy based on the current total active power variation and a single-unit storage energy value of each wind turbine in the wind farm in a case that the current total active power variation of the wind farm is greater than zero;

distributing the current single-unit active power variation to each wind turbine according to the first preset strategy based on the current total active power variation and a lowerable power value of each wind turbine in the wind farm in a case that the current total active power variation of the wind farm is smaller than zero, where the first preset strategy is to equalize the current single-unit active power variation of each wind turbine, or the first preset strategy is to equalize current single-unit active power variations of multiple wind turbines, and current single-unit active power variations of other wind turbines except the multiple wind turbines are equal to single-unit storage energy values or lowerable power values thereof; and controlling each wind turbine to adjust its operating state according to the distributed current single-unit active power variation.

According to embodiments of the present disclosure, a device for distributing active power for a wind farm is provided. The device includes:

a total active power variation calculation unit, configured to calculate a current total active power variation of the wind farm according to a current frequency variation of a power grid;

a single-unit active power variation distribution unit, configured to distribute a current single-unit active power variation to each wind turbine according to a first preset strategy based on the current total active power variation and a single-unit storage energy value of each wind turbine in the wind farm in a case that the current total active power variation of the wind farm is greater than zero, and to distribute the current single-unit active power variation to each wind turbine according to the first preset strategy based on the current total active power variation and a lowerable power value of each wind turbine in the wind farm in a case that the current total active power variation of the wind farm is smaller than zero, where the first preset strategy is to equalize the current single-unit active power variation of each wind turbine, or the first preset strategy is to equalize current single-unit active power variations of multiple wind turbines, and current single-unit active power variations of other wind turbines except the multiple wind turbines are equal to single-unit storage energy values or lowerable power values thereof; and an operating state adjustment unit, configured to control each wind turbine to adjust its operating state according to the distributed current single-unit active power variation.

According to a method and a device for distributing active power for a wind farm provided by embodiments of the present disclosure, a current total active power variation of the wind farm is calculated according to a current frequency variation of a power grid. A current single-unit active power variation is distributed to each wind turbine according to a first preset strategy based on the current total active power variation and a single-unit storage energy value of each wind turbine in the wind farm in a case that the current total active power variation of the wind farm is greater than zero. And the current single-unit active power variation is distributed to each wind turbine according to the first preset strategy based on the current total active power variation and a lowerable power value of each wind turbine in the wind farm in a case that the current total active power variation of the wind farm is smaller than zero. The first preset strategy is to equalize the current single-unit active power variation of each wind turbine, or to equalize current single-unit active power variations of multiple wind turbines, and current single-unit active power variations of other wind turbines except the multiple wind turbines are equal to single-unit storage energy values or lowerable power values thereof. And each wind turbine is controlled to adjust its operating state according to the distributed current single-unit active power variation. Since the current single-unit active power variation distributed to each wind turbine according to the first preset strategy is as equal to each other as possible, and the adjustment of the operating state is within the scope of capability of each wind turbine, the changed active power value of each wind turbine in the whole wind farm is as uniform as possible, thereby shortening the response time of the whole frequency modulation control process and reducing the impact on the wind turbine during the frequency modulation control.

BRIEF DESCRIPTION OF THE DRAWINGS

The drawings to be used in the descriptions of embodiments of the present disclosure or the conventional technology are described briefly as follows, so that technical solutions according to the embodiments of the present disclosure or the conventional technology may become clearer. Apparently, the drawings in the following descriptions only illustrate some embodiments of the present disclosure. For those in the art, other drawings may be obtained based on these drawings without any creative work.

DETAILED DESCRIPTION OF EMBODIMENTS

To make those skilled in the art understand the technical solutions more clearly, the technical solutions according to embodiments of the present disclosure will be described clearly and completely as follows in conjunction with the accompany drawings in the embodiments of the present disclosure. It is clear that the described embodiments are only a part of the embodiments according to the present disclosure. All the other embodiments obtained by those skilled in the art based on the embodiments in the present disclosure without any creative work falls within the scope of the present disclosure.

It should be understood that, the technical terms "and/or" used in the present application merely illustrate a relation of association objects described, and there may be three kinds of relations. For example, A and/or B may be explained as the following three situations: A exists alone, A and B exist simultaneously, and B exists alone. In addition, the character "/" in the present application generally shows a "or" relation of the foregoing and following association objects.

And the word "if" in the present application may be understood as "at the time of . . . ", or "when . . . " or "in response to determining . . . " or "in response to detecting . . . ", which depends on the context. Similarly, the phase "if determining . . . " or "if detecting (a condition or event recited)" may be understood as "when determining . . . ", or "in response to determining . . . " or "when detecting (a condition or event recited) or "in response to detecting (a condition or event recited)", which depends on the context.

Figure 1:
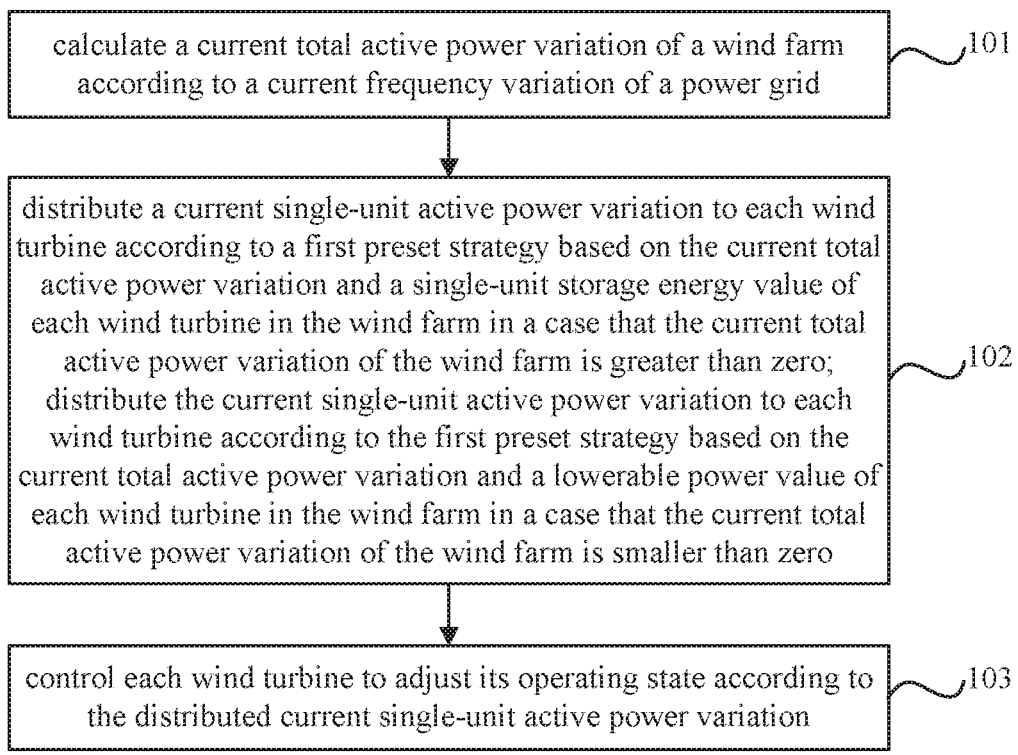
FIG. 1 is a flow chart of a first embodiment of a method for distributing active power for a wind farm according to the present disclosure.

Reference is made to FIG. 1, which is a flow chart of a first embodiment of a method for distributing active power for a wind farm according to the present disclosure. As shown in FIG. 1, this embodiment of the present disclosure is executed by an active power distribution device of a wind farm. The method for distributing active power for a wind farm provided by the embodiment of the present disclosure includes the following steps 101 to 103.

In step 101, a current total active power variation of the wind farm is calculated according to a current frequency variation of a power grid.

In this embodiment, the current total active power variation of the wind farm may be a positive value, a negative value or zero. In a case that the current total active power variation of the wind farm is a positive value, it illustrates that each wind turbine needs to increase single-unit active power output. In a case that the current total active power variation of the wind farm is a negative value, it illustrates that each wind turbine needs to decrease the single-unit active power output. And in a case that the current total active power variation of the wind farm is zero, it illustrates that each wind turbine needs to maintain the current operating state, without increasing or decreasing the active power output.

Specifically, in this embodiment, there is a positive correlation between the current frequency variation of the power grid and the current total active power variation of the wind farm, and the detailed calculation method thereof is not limited in the embodiment.

In step 102, a current single-unit active power variation is distributed to each wind turbine according to a first preset strategy based on the current total active power variation and a single-unit storage energy value of each wind turbine in the wind farm in a case that the current total active power variation of the wind farm is greater than zero, and the current single-unit active power variation is distributed to each wind turbine according to the first preset strategy based on the current total active power variation and a lowerable power value of each wind turbine in the wind farm in a case that the current total active power variation of the wind farm is smaller than zero.

The first preset strategy is to equalize the current single-unit active power variation of each wind turbine, or to equalize the current single-unit active power variations of multiple wind turbines, and the current single-unit active power variations of other wind turbines except the multiple wind turbines are equal to the single-unit storage energy values or the lowerable power values thereof.

In this embodiment, the first preset strategy is not limited, only if it equalizes the distributed current single-unit active power variation of each wind turbine. If both the single-unit storage energy value and the lowerable power value of each wind turbine are greater than undistributed average active power, then the current single-unit active power variation distributed to each wind turbine is equal, and is equal to the undistributed average active power. If the single-unit storage energy values or the lowerable power values of some wind turbines are greater than the undistributed average active power distributed to each wind turbine, while the single-unit storage energy values or the lowerable power values of some wind turbines are smaller than or equal to the undistributed average active power distributed to each wind turbine, then the current single-unit active power variations distributed to multiple wind turbines are equal to each other, and are equal to the undistributed average active power, and the current single-unit active power variations of other wind turbines except the multiple wind turbines are equal to the single-unit storage energy values or lowerable power values thereof.

In this embodiment, the single-unit storage energy value of each wind turbine is a single-unit storage energy value when the total active power variation of the wind farm is zero.

In this embodiment, the single-unit storage energy value of each wind turbine is composed of three parts including a limited power storage energy value, an excess storage energy value and an inertia storage energy value. The single-unit storage energy value of the i-th wind turbine is expressed as the following formula (1):

$$P_{si}=P_{sli}+P_{soi}+P_{sti} \quad (1)$$

where $P_{si}$ is a single-unit storage energy value of the i-th wind turbine, $P_{sli}$ is a limited power storage energy value of the i-th wind turbine, $P_{soi}$ is an excess storage energy value of the i-th wind turbine, and $P_{sti}$ is an inertia storage energy value of the i-th wind turbine.

If the i-th wind turbine operates in a limited power state, the limited power storage energy value of the i-th wind turbine is a difference value between theoretical generation power of the wind turbine under a wind speed, when the total active power variation of the wind farm is zero, and actual active power of the wind turbine when the total active power variation of the wind farm is zero. This is expressed as the following formula (2):

$$P_{sli}=P_{mi}-P_{acti} \quad (2)$$

where $P_{mi}$ is the theoretical generation power of the wind turbine under a wind speed when the total active power variation of the wind farm is zero, and $P_{acti}$ is the actual active power of the wind turbine when the total active power variation of the wind farm is zero.

And $P_{mi}$ is calculated according to the following formula (3):

$$P_{mi}=0.5\pi\rho C_p(\lambda,\beta)V^3R^2 \quad (3)$$

where $\rho$ is air density, $C_p$ is wind energy utilization coefficient, $\lambda$ is tip speed ratio, $\beta$ is pitch angle, V is wind speed, and R is impeller radius.

It can be understood that, if the i-th wind turbine does not operate in a limited power state, the limited power storage energy value $P_{sli}$ is zero.

In this embodiment, if the i-th wind turbine is in a full capability state, the excess storage energy value of the wind turbine is 0.1 times rated power of the wind turbine. It can be expressed as the following formula (4):

$$P_{soi}=0.1P_n \quad (4)$$

where $P_n$ is the rated power of the i-th wind turbine.

It can be understood that, if the i-th wind turbine is not in a full capability state, the excess storage energy value $P_{soi}$ of the wind turbine is zero.

In this embodiment, if active power output value of the i-th wind turbine is greater than 0.2 times the rated power, the inertia storage energy value is 0.1 times the rated power of the wind turbine. It can be expressed as the following formula (5):

$$P_{sti}=0.1P_n \quad (5)$$

wherein $P_n$ is the rated power of the i-th wind turbine.

It can be understood that, if the active power output value of the i-th wind turbine is not greater than 0.2 times the rated power, the inertia storage energy value is zero.

Therefore, in this embodiment, the limited power storage energy value, the excess storage energy value and the inertia storage energy value of the single-unit storage energy value of each wind turbine are calculated according to the formula (2), formula (4) and formula (5) respectively if a corresponding condition is satisfied. And the corresponding storage energy value is zero if the corresponding condition is not satisfied.

In this embodiment, the lowerable power value of each wind turbine may be calculated based on an active power value when the total active power variation of the wind farm is zero and corresponding active power lower limit.

The lowerable power value of each wind turbine is equal to a difference value between the active power value when the total active power variation of the wind farm is zero and the corresponding active power lower limit.

The active power lower limit of the wind turbine is a minimum value of active power of the wind turbine.

In step 103, each wind turbine is controlled to adjust its operating state according to the distributed current single-unit active power variation.

Specifically, in this embodiment, after distributing the current single-unit active power variation to each wind turbine according to the first preset strategy, each wind turbine is controlled to adjust the operating state according to the distributed current single-unit active power variation, to make the current total active power variation of the wind farm satisfy the current frequency variation of the power grid and the frequency modulation control of the power grid after the operating state of each wind turbine is adjusted.

According to the method for distributing active power for a wind farm provided by the embodiment of the present disclosure, a current total active power variation of the wind farm is calculated according to a current frequency variation of a power grid. A current single-unit active power variation is distributed to each wind turbine according to a first preset strategy based on the current total active power variation and a single-unit storage energy value of each wind turbine in the wind farm in a case that the current total active power variation of the wind farm is greater than zero. And the current single-unit active power variation is distributed to each wind turbine according to the first preset strategy based on the current total active power variation and a lowerable power value of each wind turbine in the wind farm in a case that the current total active power variation of the wind farm is smaller than zero. The first preset strategy is to equalize the current single-unit active power variation of each wind turbine, or to equalize the current single-unit active power variations of multiple wind turbines, and the current single-unit active power variations of other wind turbines except the multiple wind turbines are equal to the single-unit storage energy values or the lowerable power values thereof. And each wind turbine is controlled to adjust its operating state according to the distributed current single-unit active power variation. Since the current single-unit active power variation distributed to each wind turbine according to the first preset strategy is as equal to each other as possible, and the adjustment of the operating state is within the scope of capability of each wind turbine, the changed active power of each wind turbine in the whole wind farm is as uniform as possible, thereby shortening the response time of the whole frequency modulation control process and reducing the impact on the wind turbine during the frequency modulation control.

Figure 2:
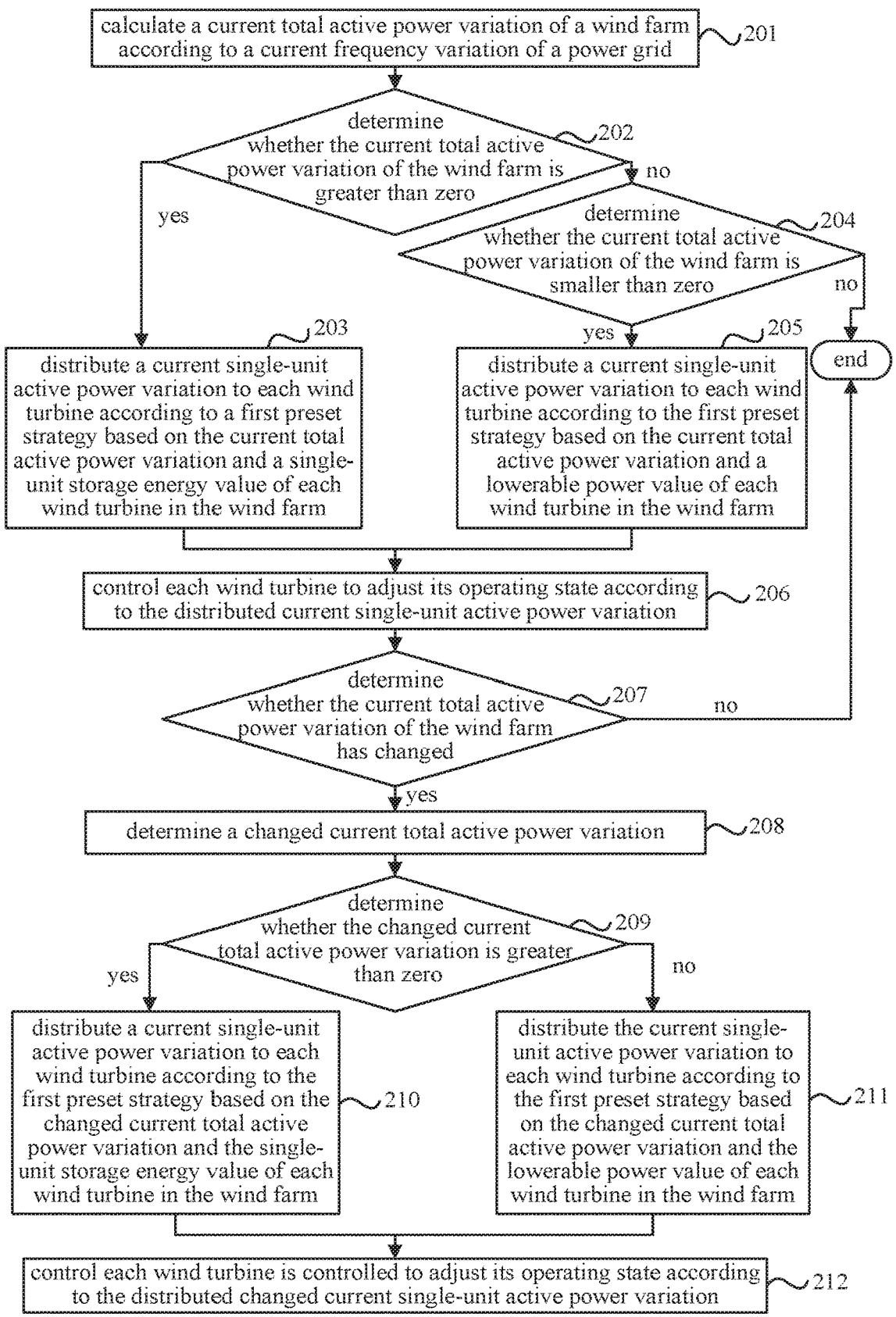
FIG. 2 is a flow chart of a second embodiment of a method for distributing active power for a wind farm according to the present disclosure.

Reference is made to FIG. 2, which is a flow chart of a second embodiment of a method for distributing active power for a wind farm according to the present disclosure. As shown in FIG. 2, the method for distributing active power for the wind farm provided by this embodiment refines further the step 102 of the method for distributing active power for the wind farm provided by the first embodiment. The method for distributing active power for the wind farm provided by this embodiment includes the following steps 201 to 212.

In step 201, a current total active power variation of the wind farm is calculated according to a current frequency variation of a power grid.

In this embodiment, the implementation mode of the step 201 is the same as the step 101 in the method for distributing active power for the wind farm provide by the first embodiment, which is not described again here.

In step 202, it is determined whether the current total active power variation of the wind farm is greater than zero, and step 203 is executed if it is yes, otherwise step 204 is executed.

Further, in this embodiment, each parameter is expressed by a symbol for convenience.

Specifically, $\Delta P_{total}$ is current total active power variation of the wind farm, $P_{si}$ is a single-unit storage energy value of each wind turbine, $P_{di}$ is a lowerable power value of each wind turbine, and $\Delta P_i$ is current single-unit active power variation distributed to each wind turbine.

In step 203, a current single-unit active power variation is distributed to each wind turbine according to a first preset strategy based on the current total active power variation and a single-unit storage energy value of each wind turbine in the wind farm.

Further, in this embodiment, the step 203 specifically includes the following steps.

Firstly, the single-unit storage energy value of each wind turbine in the wind farm is acquired, and the single-unit storage energy values of all wind turbines are ranked in an ascending order.

Specifically, since parameters, external environment and operating state of each wind turbine are different, the single-unit storage energy values thereof are also different from each other. The single-unit storage energy value of each wind turbine is a single-unit storage energy value when the current total active power variation of the wind farm is zero.

In this embodiment, the method for calculating the single-unit storage energy value of each wind turbine is the same as the calculation method for the single-unit storage energy value in the step 102 of the method for distributing active power for the wind farm provided by the first embodiment of the present disclosure, and thus it is not described again here.

Secondly, a current undistributed total active power variation is divided by the quantity of undistributed wind turbines, to serve as undistributed average active power.

Thirdly, it is determined whether the single-unit storage energy values are smaller than the undistributed average active power in sequence in an ascending order.

Specifically, in this embodiment, the undistributed average active power is denoted as $\Delta X_i$, and $\Delta X_i$ is expressed as the following formula (6):

$$\Delta X_i = (\Delta P_{temp} - P_{S(i-1)})/(t-i+1) \quad (6)$$

where $\Delta P_{temp} - P_{S(i-1)}$ is undistributed total active power variation, $t-i+1$ is the quantity of undistributed wind turbines, $\Delta P_{temp}$ is a varying temporary variable and initial value of $\Delta P_{temp}$ is equal to $\Delta P_{total}$. And values of $\Delta P_{temp} - P_{S(i-1)}$ and $t-i+1$ may change if the current single-unit active power variation is distributed to each wind turbine.

Finally, a current single-unit active power variation distributed to a corresponding wind turbine is equal to the single-unit storage energy value thereof in a case that the single-unit storage energy value is smaller than the undistributed average active power; and the current single-unit active power variation distributed to the corresponding wind turbine is equal to the undistributed average active power in a case that the single-unit storage energy value is greater than or equal to the undistributed average active power.

Further, it can be expressed by symbols in the following:
if $P_{si} < \Delta X_i$, then $\Delta P_i = P_{si}$; and
if $P_{si} \geq \Delta X_i$, then $\Delta P_i = \Delta P_{i+1} = \Delta P_{i+2} = \ldots \Delta P_t = \Delta X_i$.

Specifically, since the single-unit storage energy value of each wind turbine in the wind farm is ranked in an ascending order, when determining whether the single-unit storage energy values are smaller than the undistributed average active power in sequence in the ascending order, if the single-unit storage energy value of i-th wind turbine is greater than or equal to the undistributed average active power, the single-unit storage energy values of subsequent (i+1)-th wind turbine to the t-th wind turbine are also greater than or equal to the undistributed average active power. And current single-unit power variation distributed to the (i+1)-th wind turbine to the t-th wind turbine is equal to current single-unit power variation distributed to the i-th wind turbine, and is also equal to the undistributed average active power.

In step 204, it is determined whether the current total active power variation of the wind farm is smaller than zero, and step 205 is executed if it is yes, otherwise, the process is over.

In step 205, a current single-unit active power variation is distributed to each wind turbine according to the first preset strategy based on the current total active power variation and a lowerable power value of each wind turbine in the wind farm.

Further, the step 205 may include the following steps.

Firstly, the lowerable power value of each wind turbine in the wind farm is acquired, and the lowerable power values of all wind turbines are ranked in an ascending order.

Specifically, since parameters, external environment and operating state of each wind turbine are different; the lowerable power values thereof are also different from each other. And the method for calculating the lowerable power value of each wind turbine is the same to the calculation method in the step 102 of the method for distributing active power for the wind farm provided by the above embodiment of the present disclosure, and thus it is not described again here.

Secondly, a current undistributed total active power variation is divided by the quantity of undistributed wind turbines, to serve as undistributed average active power.

Thirdly, it is determined whether the lowerable power values are smaller than the undistributed average active power in sequence in an ascending order.

Similarly, in this embodiment, the method for determining whether the lowerable power values are smaller than the undistributed average active power in sequence in an ascending order is similar to the method for determining whether the single-unit storage energy value is smaller than the undistributed average active power in sequence in an ascending order in the step 203 of this embodiment, thus it is not described again here.

Finally, a current single-unit active power variation distributed to a corresponding wind turbine is equal to the lowerable power value thereof in a case that the lowerable power value is smaller than the undistributed average active power; and the current single-unit active power variation distributed to the corresponding wind turbine is equal to the undistributed average active power in a case that the lowable power value is greater than or equal to the undistributed average active power.

Further, it can be expressed by symbols in the following:
if $P_{di} < \Delta X_i$, then $\Delta P_i = P_{di}$; and
if $P_{di} \geq \Delta X_i$, then $\Delta P_i = \Delta P_{i+1} = \Delta P_{i+2} = \ldots \Delta P_i = \Delta X_i$.

Specifically, since the lowerable power value of each wind turbine in the wind farm is ranked in an ascending order, when determining whether the lowerable power values are smaller than the undistributed average active power in sequence in the ascending order, if the lowerable power value of i-th wind turbine is greater than or equal to the undistributed average active power, the lowerable power values of subsequent (i+1)-th wind turbine to the t-th wind turbine are also greater than or equal to the undistributed average active power. And current single-unit power variation distributed to the (i+1)-th wind turbine to the t-th wind turbine is equal to current single-unit power variation distributed to the i-th wind turbine, and is also equal to the undistributed average active power.

In step 206, each wind turbine is controlled to adjust its operating state according to the distributed current single-unit active power variation.

In this embodiment, the implementation mode of step 206 is the same to the implementation mode of the step 103 in the method for distributing active power for the wind farm provided by the above embodiment, thus it is not described again here.

In step 207, it is determined whether the current total active power variation of the wind farm has changed, and step 208 is executed if it is yes, otherwise the process is over.

In step 208, a changed current total active power variation is determined.

In step 209, it is determined whether the changed current total active power variation is greater than zero, and step 210 is executed if it is yes, otherwise step 211 is executed.

In step 210, a current single-unit active power variation is distributed to each wind turbine according to the first preset strategy based on the changed current total active power variation and the single-unit storage energy value of each wind turbine in the wind farm.

In step 211, the current single-unit active power variation is distributed to each wind turbine according to the first preset strategy based on the changed current total active power variation and the lowerable power value of each wind turbine in the wind farm.

In step 212, each wind turbine is controlled to adjust its operating state according to the distributed changed current single-unit active power variation.

Descriptions of this embodiment are made in conjunction with the steps 207 to 212. It can be understood that, the changed current total active power variation is determined again when the current total active power variation of the wind farm changes. The changed current single-unit active power variation distributed to each wind turbine is calculated according to the steps 209 to 211. And the implementation mode of the steps 209 to 211 is similar to the implementation mode of the steps 202 to 205 in the method for distributing active power for the wind farm provided by the first embodiment, thus it is not described again here. Then, each wind turbine is controlled to adjust the operating state according to the distributed changed current single-unit active power variation according to the step 212, and the implementation mode of the step 212 is similar to the implementation mode of the step 206 in the method for distributing active power for the wind farm provided by the first embodiment, thus it is not described again here.

According to the method for distributing active power for the wind farm provided by this embodiment, the distributing a current single-unit active power variation to each wind turbine according to a first preset strategy based on the current total active power variation and a single-unit storage energy value of each wind turbine in the wind farm specifically includes the following steps. The single-unit storage energy value of each wind turbine in the wind farm is acquired, and the single-unit storage energy values of all wind turbines are ranked in an ascending order. A current undistributed total active power variation is divided by the quantity of undistributed wind turbines, to serve as undistributed average active power. It is determined whether the single-unit storage energy values are smaller than the undistributed average active power in sequence in an ascending order. A current single-unit active power variation distributed to a corresponding wind turbine is equal to the single-unit storage energy value thereof in a case that the single-unit storage energy value is smaller than the undistributed average active power. And the current single-unit active power variation distributed to the corresponding wind turbine is equal to the undistributed average active power in a case that the single-unit storage energy value is greater than or equal to the undistributed average active power. Therefore, the current single-unit active power variation distributed to each wind turbine is as equal to each other as possible, and the adjustment of the operating state is within the scope of capability of each wind turbine.

According to the method for distributing active power for the wind farm provided by this embodiment, the distributing a current single-unit active power variation to each wind turbine according to a first preset strategy based on the current total active power variation and a lowerable power value of each wind turbine in the wind farm specifically includes the following steps. A lowerable power value of each wind turbine in the wind farm is acquired, and the lowerable power values of all wind turbines are ranked in an ascending order. A current undistributed total active power variation is divided by the quantity of undistributed wind turbines, to serve as undistributed average active power. It is determined whether the lowerable power values are smaller than the undistributed average active power in sequence in an ascending order. A current single-unit active power variation distributed to a corresponding wind turbine is equal to the lowerable power value thereof in a case that the lowerable power value is smaller than the undistributed average active power. And the current single-unit active power variation distributed to the corresponding wind turbine is equal to the undistributed average active power in a case that the lowerable power value is greater than or equal to the undistributed average active power. Therefore, the current single-unit active power variation distributed to each wind turbine is as equal to each other as possible, and the adjustment of the operating state is within the scope of capability of each wind turbine.

Figure 3:
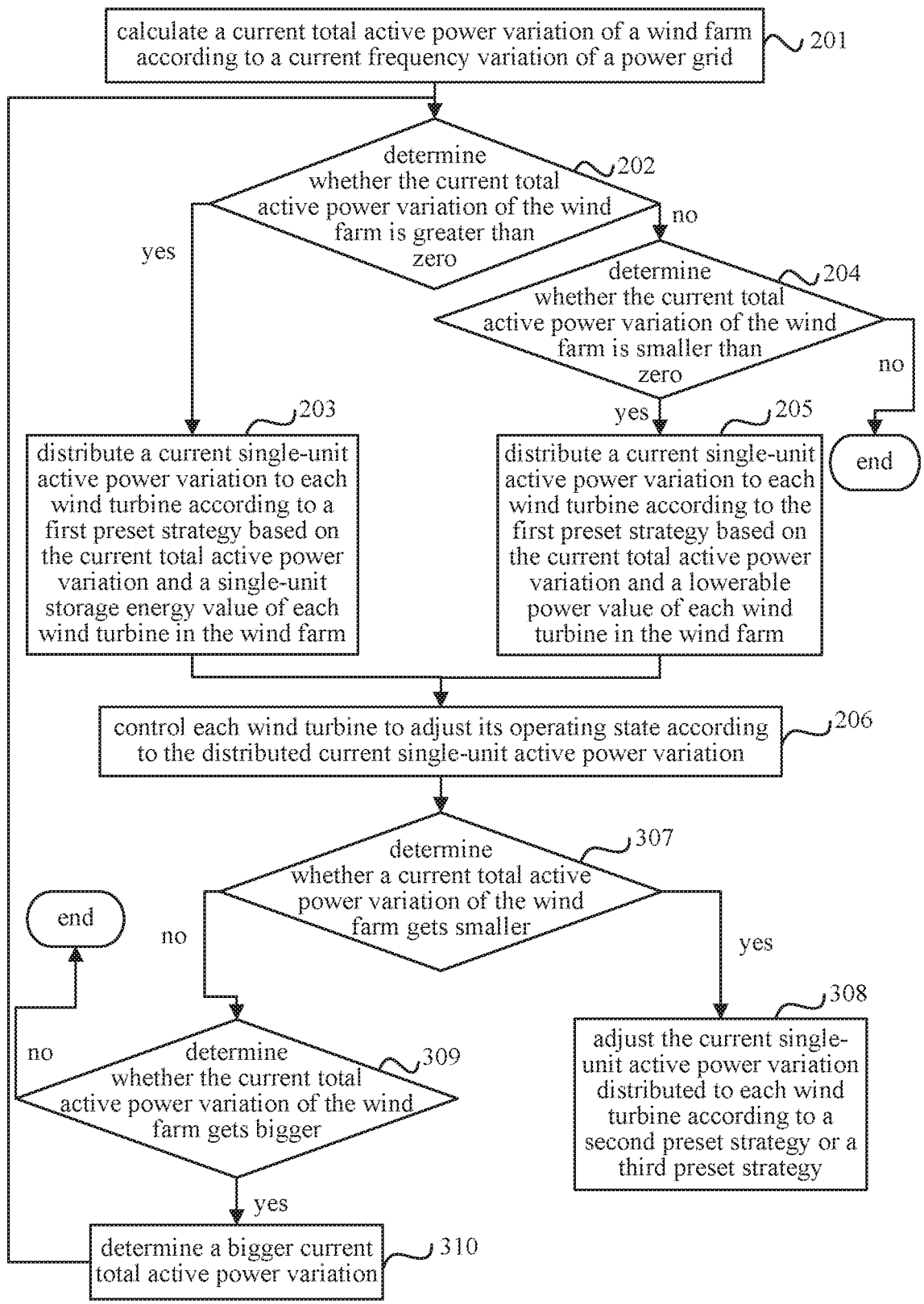
FIG. 3 is a flow chart of a third embodiment of a method for distributing active power for a wind farm according to the present disclosure.

Reference is made to FIG. 3, which is a flow chart of a third embodiment of a method for distributing active power for a wind farm according to the present disclosure. As shown in FIG. 3, in this embodiment, based on the method for distributing active power for a wind farm provided by the first embodiment of the present disclosure, after execution, for the first time, of the step 206 of controlling each wind turbine to adjust its operating state according to a distributed current single-unit active power variation, the method further includes the following steps 307 to 310.

In step 307, it is determined whether a current total active power variation of the wind farm gets smaller, and step 308 is executed if it is yes, otherwise step 309 is executed.

Further, in this embodiment, if the current total active power variation changes from $\Delta P_{total}$ to $\Delta P'_{total}$, and $\Delta P_{total} > \Delta P'_{total}$, it illustrates that a current single-unit active power variation distributed to each wind turbine also gets smaller. And the wind turbine is able to adjust its operating state according to the distributed current single-unit active power variation.

In step 308, the current single-unit active power variation distributed to each wind turbine is adjusted according to a second preset strategy and a third preset strategy.

The second preset strategy is a strategy to fine adjust the current single-unit active power variation of each wind turbine according to reduction of the current total active power variation of the wind farm. The third preset strategy is a strategy to determine a weight of fine adjustment according to the current single-unit active power variation distributed to each wind turbine.

Further, the adjusting the current single-unit active power variation distributed to each wind turbine according to a second preset strategy specifically includes the following steps.

Firstly, reduction of the current total active power variation of the wind farm is calculated.

Secondly, the reduction of the current total active power variation of the wind farm is divided by the quantity of all wind turbines in the wind farm, to serve as an average reduction value.

Specifically, it is expressed as the following formula (7):

$$P_{mean} = (\Delta P_{total} - \Delta P'_{total})/t \tag{7}$$

Thirdly, a first difference value between a current single-unit active power variation distributed to each wind turbine and the average reduction value is calculated.

Specifically, it is expressed as the following formula (8):

$$\Delta P_{mean\ 1} = \Delta P_i - P_{mean} = \Delta P_i - (\Delta P_{total} - \Delta P'_{total})/t \tag{8}$$

Finally, the current single-unit active power variation distributed to each wind turbine is adjusted according to the first difference value.

Specifically, the first difference value between the current single-unit active power variation distributed to each wind turbine and the average reduction value is an adjusted current single-unit active power variation distributed to each wind turbine.

Further, the adjusting the current single-unit active power variation distributed to each wind turbine according to a third preset strategy specifically includes the following steps.

Firstly, reduction of the current total active power variation of the wind farm is calculated.

Specifically, in this embodiment, the reduction of the current total active power variation of the wind farm is calculated according to the formula (7).

Secondly, a weight of the current single-unit active power variation of each wind turbine is calculated according to the current single-unit active power variation distributed to each wind turbine.

Specifically, in this embodiment, the weight of the current single-unit active power variation of each wind turbine is determined according to a ratio of the current single-unit active power variation distributed to each wind turbine to the current total active power variation.

Thirdly, reduction of the current single-unit active power variation distributed to each wind turbine is calculated according to the weight of the current single-unit active power variation of each wind turbine and the reduction of the current total active power variation of the wind farm.

Then, a second difference value between the current single-unit active power variation distributed to each wind turbine and the reduction of the current single-unit active power variation is calculated.

This is expressed as the following formula (9):

$$\Delta P_{mean\ 2} = \Delta P_i - P_{mean} = \Delta P_i - (\Delta P_{total} - \Delta P'_{total}) * K_i \tag{9}$$

where $K_i$ is the weight of the current single-unit active power variation of the i-th wind turbine, and $(\Delta P_{total} - \Delta P'_{total}) * K_i$ is the reduction of the current single-unit active power variation distributed to each wind turbine.

Finally, the current single-unit active power variation distributed to each wind turbine is adjusted according to the second difference value.

Specifically, the second difference value between the current single-unit active power variation distributed to each wind turbine and the reduction of the current single-unit active power variation is an adjusted current single-unit active power variation distributed to each wind turbine.

In step 309, it is determined whether the current total active power variation of the wind farm gets bigger, and if it is yes, step 310 is executed, otherwise the process is over.

In step 310, a bigger current total active power variation is determined.

Specifically, in this embodiment, if the current total active power variation of the wind farm gets bigger, it illustrates that current single-unit active power variation distributed to each wind turbine becomes bigger as well. Since the maximum capability of adjusting the operating state of the wind turbine having a smaller single-unit storage energy value or lowerable power value is reached, the single-unit active power distributed to each wind turbine cannot be adjusted by using the second preset strategy or the third preset strategy. In this embodiment, if it is determined that the current total active power variation of the wind farm gets bigger, the current single-unit active power variation distributed to each wind turbine is recalculated according to steps 202 to 205, and each wind turbine is again controlled to adjust its operating state according to the distributed current single-unit active power variation based on the step 206.

The step 202 is executed after executing the step 310.

According to the method for distributing active power for the wind farm provided by this embodiment, it is determined whether the current total active power variation of the wind farm gets smaller. If the current total active power variation of the wind farm gets smaller, the single-unit active power distributed to each wind turbine is adjusted according to the second preset strategy or the third preset strategy. Therefore, the step of recalculating the single-unit active power distributed to each wind turbine is omitted, to determine the adjusted current single-unit active power variation distributed to each wind turbine, and the calculation is simplified.

Those skilled in the art should understand that, all or part of the steps to implement the method embodiments may be completed by hardware related to program instructions. The above program may be stored in a readable storage medium. And the steps included in the above embodiments are executed when the program is executed. The storage medium includes: ROM, RAM, a disk, a light disk, or any other medium that can store program codes.

Figure 4:
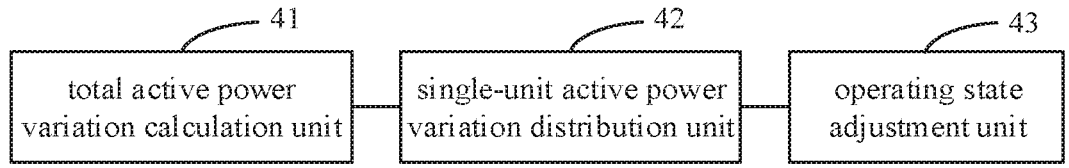
FIG. 4 is a structural schematic diagram of a first embodiment of a device for distributing active power for a wind farm according to the present disclosure.

Reference is made to FIG. 4, which is a structural schematic diagram of a first embodiment of a device for distributing active power for a wind farm according to the present disclosure. As shown in FIG. 4, the device for distributing active power for the wind farm provided by the embodiment includes: a total active power variation calculation unit 41, a single-unit active power variation distribution unit 42 and an operating state adjustment unit 43.

The total active power variation calculation unit 41 is configured to calculate a current total active power variation of the wind farm according to a current frequency variation of a power grid. The single-unit active power variation distribution unit 42 is configured to distribute a current single-unit active power variation to each wind turbine according to a first preset strategy based on the current total active power variation and a single-unit storage energy value of each wind turbine in the wind farm in a case that the current total active power variation of the wind farm is greater than zero; and to distribute the current single-unit active power variation to each wind turbine according to the first preset strategy based on the current total active power variation and a lowerable power value of each wind turbine in the wind farm in a case that the current total active power variation of the wind farm is smaller than zero. The first preset strategy is to equalize the current single-unit active power variation of each wind turbine, or to equalize the current single-unit active power variations of multiple wind turbines, and the current single-unit active power variations of other wind turbines except the multiple wind turbines are equal to the single-unit storage energy values or the lowerable power values thereof. The operating state adjustment unit 43 is configured to control each wind turbine to adjust its operating state according to the distributed current single-unit active power variation.

Wherein the device for distributing active power for the wind farm provided by this embodiment may execute technical solutions of the method embodiment shown in FIG. 1, and the implement principle and technical effect thereof are similar to that of the method embodiment, which are not described again here.

Figure 5:
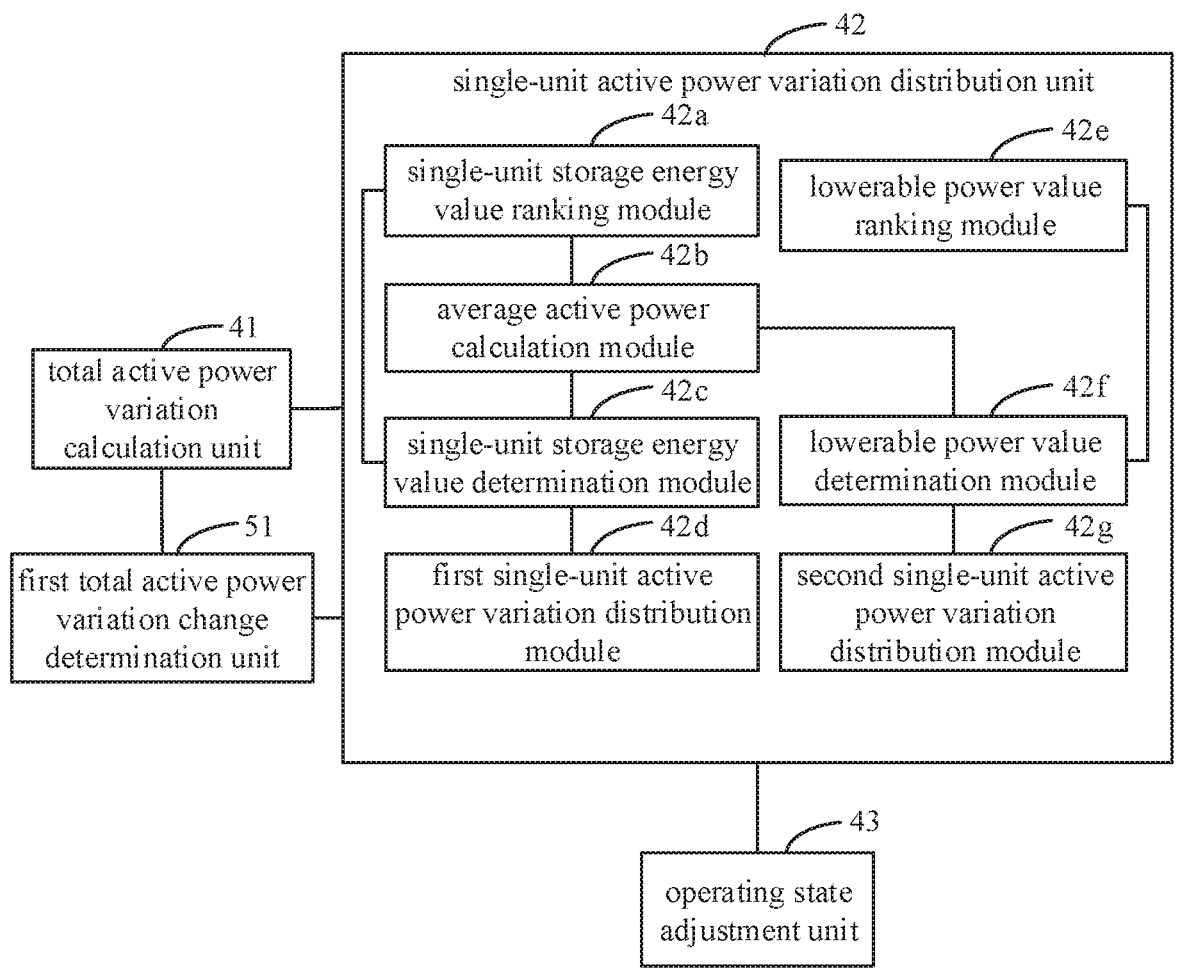
FIG. 5 is a structural schematic diagram of a second embodiment of a device for distributing active power for a wind farm according to the present disclosure.

Reference is made to FIG. 5, which is a structural schematic diagram of a second embodiment of a device for distributing active power for a wind farm according to the present disclosure. As shown in FIG. 5, based on the device for distributing active power for the wind farm provided by the first embodiment, the device for distributing active power for the wind farm provided by this embodiment further includes a first total active power variation change determination unit 51.

Further, the single-unit active power variation distribution unit 42 specifically includes: a single-unit storage energy value ranking module 41a, an average active power calculation module 42b, a single-unit storage energy value determination module 42c, and a first single-unit active power variation distribution module 42d.

The single-unit storage energy value ranking module 41a is configured to acquire the single-unit storage energy value of each wind turbine in the wind farm, and rank the single-unit storage energy values of all wind turbines in an ascending order. The average active power calculation module 42b is configured to calculate a value of dividing a current undistributed total active power variation by the quantity of undistributed wind turbines, to serve as undistributed average active power. The single-unit storage energy value determination module 42c is configured to determine whether the single-unit storage energy values are smaller than the undistributed average active power in sequence in an ascending order. The first single-unit active power variation distribution module 42d is configured to distribute to a wind turbine a current single-unit active power variation, which is equal to the single-unit storage energy value thereof, in a case that the single-unit storage energy value is smaller than the undistributed average active power, and to distribute to the wind turbine a current single-unit active power variation, which is equal to the undistributed average active power, in a case that the single-unit storage energy value is greater than or equal to the undistributed average active power.

Further, the single-unit active power variation distribution unit 42 specifically includes: a lowerable power value ranking module 42e, a lowerable power value determination module 42f and a second single-unit active power variation distribution module 42g. The lowerable power value ranking module 42e is configured to acquire the lowerable power value of each wind turbine in the wind farm, and rank the lowerable power values of all wind turbines in an ascending order. The lowerable power value determination module 42f is configured to determine whether the lowerable power values are smaller than the undistributed average active power in sequence in an ascending order. The second single-unit active power variation distribution module 42g is configured to distribute to a wind turbine a current single-unit active power variation, which is equal to the lowerable power value thereof, in a case that the lowerable power value is smaller than the undistributed average active power, and to distribute to the wind turbine a current single-unit active power variation, which is equal to the undistributed average active power, in a case that the lowerable power value is greater than or equal to the undistributed average active power.

Further, the first total active power variation change determination unit 51 is configured to determine whether the current total active power variation of the wind farm has changed. The single-unit active power variation distribution unit 42 is further configured to distribute a current single-unit active power variation to each wind turbine according to a first preset strategy based on a changed current total active power variation and the single-unit storage energy value of each wind turbine in the wind farm in a case that the changed current total active power variation is greater than zero, and to distribute the current single-unit active power variation to each wind turbine according to the first preset strategy based on the changed current total active power variation and the lowerable power value of each wind turbine in the wind farm in a case that the changed current total active power variation is smaller than zero.

Figure 6:
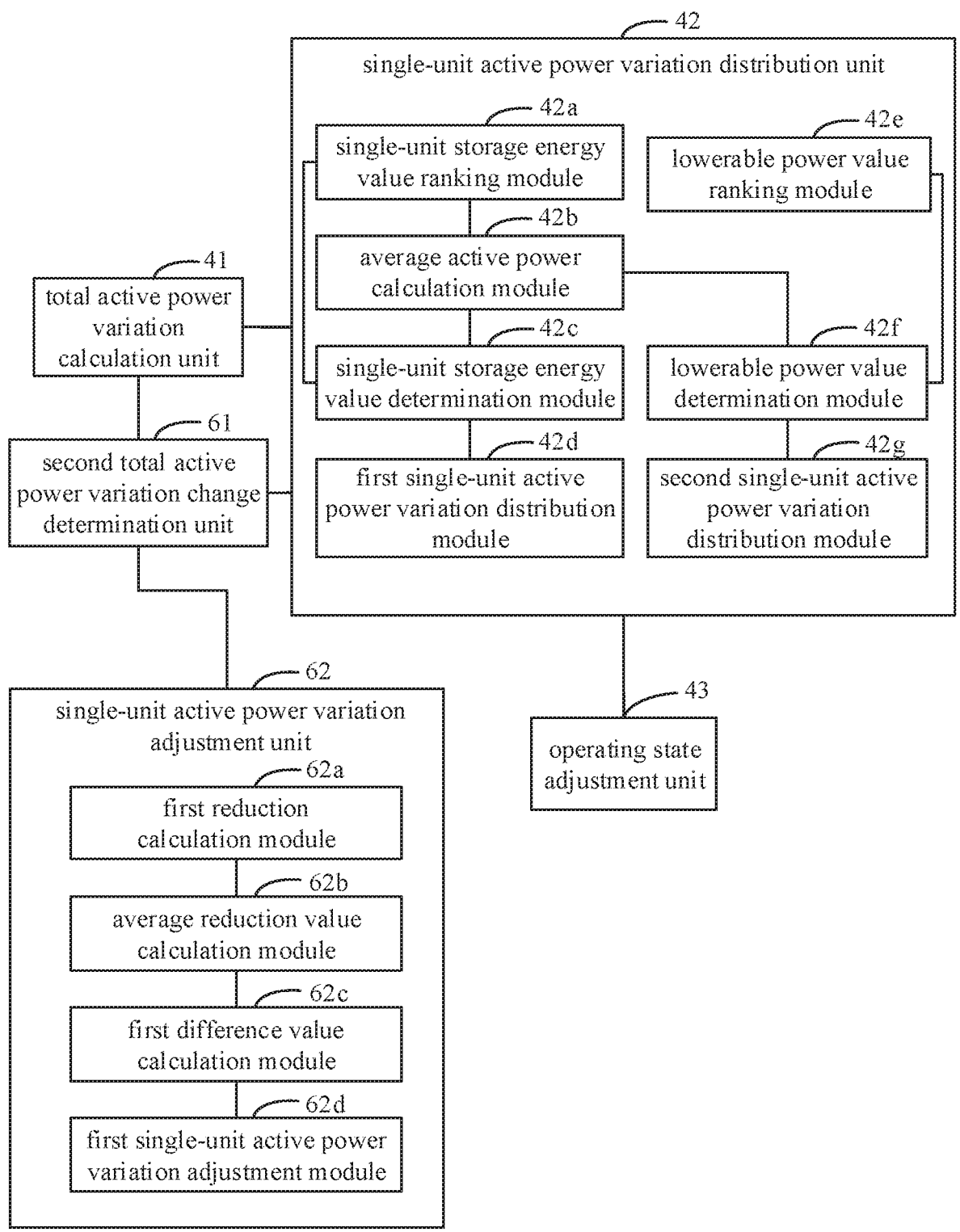
FIG. 6 is a first structural schematic diagram of a third embodiment of a device for distributing active power for a wind farm according to the present disclosure.
Figure 7:
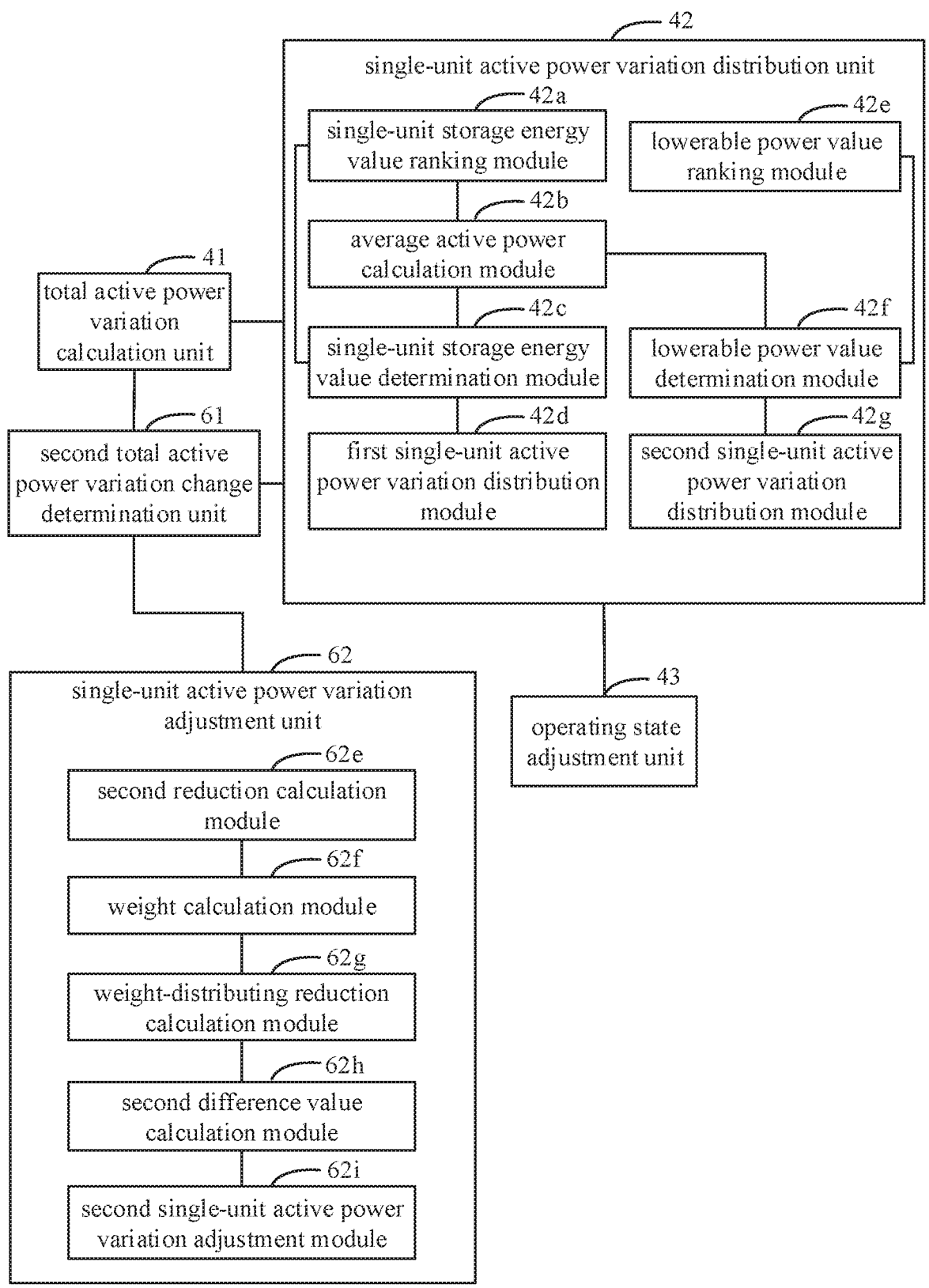
FIG. 7 is a second structural schematic diagram of a third embodiment of a device for distributing active power for a wind farm according to the present disclosure.

Reference is made to FIGS. 6 and 7, which FIG. 6 is a first structural schematic diagram of a third embodiment of a device for distributing active power for a wind farm according to the present disclosure, and FIG. 7 is a second structural schematic diagram of the third embodiment of the device for distributing active power for the wind farm according to the present disclosure. As shown in FIGS. 6 and 7, based on a device for distributing active power for a wind farm provided by the first embodiment, the device for distributing active power for the wind farm provided by this embodiment further includes: a second total active power variation change determination unit 61 and a single-unit active power variation adjustment unit 62.

Further, the second total active power variation change determination unit 61 is configured to determine whether a current total active power variation of the wind farm gets smaller. The single-unit active power variation adjustment unit 62 is configured to adjust the current single-unit active power variation distributed to each wind turbine according to a second preset strategy or a third preset strategy in a case that the current total active power variation of the wind farm gets smaller, where the second preset strategy is a strategy to fine adjust the current single-unit active power variation of each wind turbine according to reduction of the current total active power variation of the wind farm, and the third preset strategy is a strategy to determine a weight of fine adjustment according to the current single-unit active power variation distributed to each wind turbine.

Further, as shown in FIG. 6, the single-unit active power variation adjustment unit 62 specifically includes: a first reduction calculation module 62a, an average reduction value calculation module 62b, a first difference value calculation module 62c and a first single-unit active power variation adjustment module 62d.

The first reduction calculation module 62a is configured to calculate the reduction of the current total active power variation of the wind farm. The average reduction value calculation module 62b is configured to calculate a value of dividing the reduction of the current total active power variation of the wind farm by the quantity of all wind turbines in the wind farm, to serve as an average reduction value. The first difference value calculation module 62c is configured to calculate a first difference value between the current single-unit active power variation distributed to each wind turbine and the average reduction value. The first single-unit active power variation adjustment module 62d is configured to adjust the current single-unit active power variation distributed to each wind turbine according to the first difference value.

As shown in FIG. 7, the single-unit active power variation adjustment unit 62 specifically includes: a second reduction calculation module 62e, a weight calculation module 62f, a weight-distributing reduction calculation module 62g, a second difference value calculation module 62h and a second single-unit active power variation adjustment module 62i.

The second reduction calculation module 62e is configured to calculate the reduction of the current total active power variation of the wind farm. The weight calculation module 62f is configured to calculate a weight of the current single-unit active power variation of each wind turbine according to the current single-unit active power variation distributed to each wind turbine. The weight-distributing reduction calculation module 62g is configured to calculate reduction of the current single-unit active power variation distributed to each wind turbine according to the weight of the current single-unit active power variation of each wind turbine and the reduction of the current total active power variation of the wind farm. The second difference value calculation module 62h is configured to calculate a second difference value between the current single-unit active power variation distributed to each wind turbine and the reduction of the current single-unit active power variation. The second single-unit active power variation adjustment module 62i is configured to adjust the current single-unit active power variation distributed to each wind turbine according to the second difference value.

The device for distributing active power for the wind farm provided by this embodiment may execute technical solutions in the method embodiment shown in FIG. 3, and the implement principle and technical effect thereof are similar to that of the method embodiment, which are not described again here.

It is to be understood that the embodiments are merely for illustrating technical solutions of the disclosure, and not to limit the present disclosure. Although detailed descriptions of the present disclosure are made according to the foregoing embodiments, a person skilled in the art would understand that, many modifications may be made to the technical solutions described by the foregoing embodiments, or substitutions may be made to part or all technical features of the present disclosure. However, the spirit and scope of the present disclosure is not digressed from the technical solutions of the various embodiments of the present disclosure by these modifications and substitutions.

The invention claimed is:

1. A method for distributing active power for a wind farm, comprising:
    calculating a current total active power variation of the wind farm according to a current frequency variation of a power grid;
    distributing a current single-unit active power variation to each wind turbine according to a first preset strategy based on the current total active power variation and a single-unit storage energy value of each wind turbine in the wind farm in a case that the current total active power variation of the wind farm is greater than zero;
    distributing the current single-unit active power variation to each wind turbine according to the first preset strategy based on the current total active power variation and a lowerable power value of each wind turbine in the wind farm in a case that the current total active power variation of the wind farm is smaller than zero; and
    controlling each wind turbine to adjust its operating state according to the distributed current single-unit active power variation,
    wherein the distributing a current single-unit active power variation to each wind turbine according to a first preset strategy based on the current total active power variation and a single-unit storage energy value of each wind turbine in the wind farm comprises:
    acquiring the single-unit storage energy value of each wind turbine in the wind farm, and ranking the single-unit storage energy values of all wind turbines in an ascending order;
    calculating a value of a current undistributed total active power variation divided by a quantity of undistributed wind turbines, to serve as undistributed average active power;
    determining whether the single-unit storage energy values are smaller than the undistributed average active power in sequence in an ascending order;
    distributing to a wind turbine a current single-unit active power variation, that is equal to a single-unit storage energy value thereof, in a case that the single-unit storage energy value is smaller than the undistributed average active power; and
    distributing to the wind turbine a current single-unit active power variation, that is equal to the undistributed average active power, in a case that the single-unit storage energy value is greater than or equal to the undistributed average active power.

2. The method according to claim 1, wherein the distributing the current single-unit active power variation to each wind turbine according to a first preset strategy based on the current total active power variation and a lowerable power value of each wind turbine in the wind farm comprises:
    acquiring the lowerable power value of each wind turbine in the wind farm, and ranking the lowerable power values of all wind turbines in an ascending order;

calculating a value of a current undistributed total active power variation divided by the quantity of undistributed wind turbines, to serve as undistributed average active power;

determining whether the lowerable power values are smaller than the undistributed average active power in sequence in an ascending order;

distributing to a wind turbine a current single-unit active power variation, that is equal to a lowerable power value thereof, in a case that the lowerable power value is smaller than the undistributed average active power; and distributing to the wind turbine a current single-unit active power variation, that is equal to the undistributed average active power, in a case that the lowerable power value is greater than or equal to the undistributed average active power.

3. The method according to claim 2, wherein after the step of controlling each wind turbine to adjust its operating state according to the distributed current single-unit active power variation, the method further comprises:

determining whether the current total active power variation of the wind farm has changed;

determining a changed current total active power variation in a case that the current total active power variation of the wind farm has changed;

distributing a current single-unit active power variation to each wind turbine according to the first preset strategy based on the changed current total active power variation and the single-unit storage energy value of each wind turbine in the wind farm in a case that the changed current total active power variation is greater than zero; and distributing the current single-unit active power variation to each wind turbine according to the first preset strategy based on the changed current total active power variation and the lowerable power value of each wind turbine in the wind farm in a case that the changed current total active power variation is smaller than zero.

4. The method according to claim 3, further comprising:
determining whether the current total active power variation of the wind farm gets smaller; and adjusting the current single-unit active power variation distributed to each wind turbine according to a second preset strategy or a third preset strategy, in a case that the current total active power variation of the wind farm gets smaller, wherein the second preset strategy is a strategy to fine adjust the current single-unit active power variation of each wind turbine according to reduction of the current total active power variation of the wind farm, and the third preset strategy is a strategy to determine a weight of fine adjustment according to the current single-unit active power variation distributed to each wind turbine.

5. The method according to claim 4, wherein the adjusting the current single-unit active power variation distributed to each wind turbine according to a second preset strategy comprises:

calculating the reduction of the current total active power variation of the wind farm;

calculating a value of the reduction of the current total active power variation of the wind farm divided by the quantity of all wind turbines in the wind farm, to serve as an average reduction value;

calculating a first difference value between the current single-unit active power variation distributed to each wind turbine and the average reduction value; and adjusting the current single-unit active power variation distributed to each wind turbine according to the first difference value.

6. The method according to claim 4, wherein the adjusting the current single-unit active power variation distributed to each wind turbine according to a third preset strategy comprises:

calculating the reduction of the current total active power variation of the wind farm;

calculating a weight of the current single-unit active power variation of each wind turbine according to the current single-unit active power variation distributed to each wind turbine;

calculating reduction of the current single-unit active power variation distributed to each wind turbine according to the weight of the current single-unit active power variation of each wind turbine and the reduction of the current total active power variation of the wind farm;

calculating a second difference value between the current single-unit active power variation distributed to each wind turbine and the reduction of the current single-unit active power variation; and adjusting the current single-unit active power variation distributed to each wind turbine according to the second difference value.

7. A device for distributing active power for a wind farm, comprising:

a total active power variation calculation unit, implemented by a processor executing a computer program stored in a memory, being configured to calculate a current total active power variation of the wind farm according to a current frequency variation of a power grid;

a single-unit active power variation distribution unit, implemented by the processor executing the computer program stored in the memory, being configured to: distribute a current single-unit active power variation to each wind turbine according to a first preset strategy based on the current total active power variation and a single-unit storage energy value of each wind turbine in the wind farm in a case that the current total active power variation of the wind farm is greater than zero, and to distribute the current single-unit active power variation to each wind turbine according to the first preset strategy based on the current total active power variation and a lowerable power value of each wind turbine in the wind farm in a case that the current total active power variation of the wind farm is smaller than zero; and an operating state adjustment unit, implemented by the processor executing the computer program stored in the memory, being configured to control each wind turbine to adjust its operating state according to the distributed current single-unit active power variation, wherein the single-unit active power variation distribution unit comprises:

a single-unit storage energy value ranking module, implemented by the processor executing the computer program stored in the memory, being configured to acquire the single-unit storage energy value of each wind turbine in the wind farm, and rank the single-unit storage energy values of all wind turbines in an ascending order;

an average active power calculation module, implemented by the processor executing the computer program stored in the memory, being configured to calculate a value of a current undistributed total active power variation divided by a quantity of undistributed wind turbines, to serve as undistributed average active power;

a single-unit storage energy value determination module, implemented by the processor executing the computer program stored in the memory, being configured to determine whether the single-unit storage energy values are smaller than the undistributed average active power in sequence in an ascending order; and a first single-unit active power variation distribution module, implemented by the processor executing the computer program stored in the memory, being configured to distribute to a wind turbine a current single-unit active power variation, that is equal to a single-unit storage energy value thereof, in a case that the single-unit storage energy value is smaller than the undistributed average active power, and to distribute to the wind turbine a current single-unit active power variation, that is equal to the undistributed average active power, in a case that the single-unit storage energy value is greater than or equal to the undistributed average active power.

8. The device according to claim 7, wherein the single-unit active power variation distribution unit comprises:

a lowerable power value ranking module, implemented by the processor executing the computer program stored in the memory, being configured to acquire the lowerable power value of each wind turbine in the wind farm, and rank the lowerable power values of all wind turbines in an ascending order;

a lowerable power value determination module, implemented by the processor executing the computer program stored in the memory, being configured to determine whether the lowerable power values are smaller than the undistributed average active power in sequence in an ascending order; and a second single-unit active power variation distribution module, implemented by the processor executing the computer program stored in the memory, being configured to distribute to a wind turbine a current single-unit active power variation, that is equal to a lowerable power value thereof, in a case that the lowerable power value is smaller than the undistributed average active power, and to distribute to the wind turbine a current single-unit active power variation, that is equal to the undistributed average active power, in a case that the lowerable power value is greater than or equal to the undistributed average active power.

9. The device according to claim 8, further comprising:

a first total active power variation change determination unit, implemented by the processor executing the computer program stored in the memory, being configured to determine whether the current total active power variation of the wind farm has changed; and the single-unit active power variation distribution unit, implemented by the processor executing the computer program stored in the memory, being further configured to distribute a current single-unit active power variation to each wind turbine according to the first preset strategy based on the changed current total active power variation and the single-unit storage energy value of each wind turbine in the wind farm in a case that the changed current total active power variation is greater than zero, and to distribute the current single-unit active power variation to each wind turbine according to the first preset strategy based on the changed current total active power variation and the lowerable power value of each wind turbine in the wind farm in a case that the changed current total active power variation is smaller than zero.

10. The device according to claim 9, further comprising:

a second total active power variation change determination unit, implemented by the processor executing the computer program stored in the memory, being configured to determine whether the current total active power variation of the wind farm gets smaller; and a single-unit active power variation adjustment unit, implemented by the processor executing the computer program stored in the memory, being configured to adjust the current single-unit active power variation distributed to each wind turbine according to a second preset strategy or a third preset strategy in a case that the current total active power variation of the wind farm gets smaller, wherein the second preset strategy is a strategy to fine adjust the current single-unit active power variation of each wind turbine according to reduction of the current total active power variation of the wind farm, and the third preset strategy is a strategy to determine a weight of fine adjustment according to the current single-unit active power variation distributed to each wind turbine.

11. The device according to claim 10, wherein the single-unit active power variation adjustment unit comprises:

a first reduction calculation module, implemented by the processor executing the computer program stored in the memory, being configured to calculate the reduction of the current total active power variation of the wind farm;

an average reduction value calculation module, implemented by the processor executing the computer program stored in the memory, being configured to calculate a value of the reduction of the current total active power variation of the wind farm divided by the quantity of all wind turbines in the wind farm, to serve as an average reduction value;

a first difference value calculation module, implemented by the processor executing the computer program stored in the memory, being configured to calculate a first difference value between the current single-unit active power variation distributed to each wind turbine and the average reduction value; and a first single-unit active power variation adjustment module, implemented by the processor executing the computer program stored in the memory, being configured to adjust the current single-unit active power variation distributed to each wind turbine according to the first difference value.

12. The device according to claim 10, wherein the single-unit active power variation adjustment unit comprises:

a second reduction calculation module, implemented by the processor executing the computer program stored in the memory, being configured to calculate the reduction of the current total active power variation of the wind farm;

a weight calculation module, implemented by the processor executing the computer program stored in the memory, being configured to calculate a weight of the current single-unit active power variation of each wind turbine according to the current single-unit active power variation distributed to each wind turbine;

a weight-distributing reduction calculation module, implemented by the processor executing the computer program stored in the memory, being configured to calculate reduction of the current single-unit active power variation distributed to each wind turbine according to the weight of the current single-unit active power variation of each wind turbine and the reduction of the current total active power variation of the wind farm;

a second difference value calculation module, implemented by the processor executing the computer program stored in the memory, being configured to calculate a second difference value between the current single-unit active power variation distributed to each wind turbine and the reduction of the current single-unit active power variation; and a second single-unit active power variation adjustment module, implemented by the processor executing the computer program stored in the memory, being configured to adjust the current single-unit active power variation distributed to each wind turbine according to the second difference value.

\* \* \* \* \*